US012424429B2

(12) United States Patent
Quarmby et al.

(10) Patent No.: US 12,424,429 B2
(45) Date of Patent: Sep. 23, 2025

(54) DUCTING GAS OF MASS SPECTROMETER

(71) Applicant: Thermo Finnigan LLC, San Jose, CA (US)

(72) Inventors: Scott T. Quarmby, Round Rock, TX (US); Joshua T. Maze, Round Rock, TX (US)

(73) Assignee: Thermo Finnigan LLC, San Jose, CA (US)

( * ) Notice: Subject to any disclaimer, the term of this patent is extended or adjusted under 35 U.S.C. 154(b) by 428 days.

(21) Appl. No.: 18/047,801

(22) Filed: Oct. 19, 2022

(65) Prior Publication Data

US 2024/0136171 A1 Apr. 25, 2024
US 2024/0234122 A9 Jul. 11, 2024

(51) Int. Cl.
*H01J 49/24* (2006.01)
*H01J 49/42* (2006.01)

(52) U.S. Cl.
CPC ............ *H01J 49/24* (2013.01); *H01J 49/421* (2013.01)

(58) Field of Classification Search
CPC ....... H01J 49/24; H01J 49/421; H01J 49/0045
See application file for complete search history.

(56) References Cited

U.S. PATENT DOCUMENTS 4,023,398 A * 5/1977 French .................. H01J 49/067 250/281
7,230,232 B2 6/2007 Marriott
8,481,923 B1 7/2013 Kitamoto
8,610,053 B2 12/2013 Yamada et al.
8,740,587 B2 6/2014 McCauley
10,607,824 B2 * 3/2020 Kalafut ............... H01J 49/0031
10,607,828 B2 3/2020 Giles
2001/0020679 A1 * 9/2001 Franzen ................ H01J 49/004 250/293
2019/0019664 A1 * 1/2019 Furuhashi ............. H01J 49/403
2020/0303174 A1 9/2020 Midorikawa
2021/0305036 A1 * 9/2021 Quimby ............. G01N 30/7206
2023/0411139 A1 * 12/2023 Dziekonski ......... H01J 49/4225

FOREIGN PATENT DOCUMENTS

WO 00/77823 A2 12/2000

* cited by examiner

*Primary Examiner* — David E Smith
*Assistant Examiner* — Christopher J Gassen

(57) ABSTRACT

A mass spectrometer includes a vacuum chamber, a pump for maintaining a vacuum chamber at an operating vacuum pressure, an ion source, a first mass filter configured to select precursor ions, a collision/reaction cell pressurized with a collision or reaction gas and configured to generate a plurality of product ions from the precursor ions by colliding or reacting the precursor ions with one or more gas particles, and a second mass filter configured to select target ions from the product ions. Also provided are entrance and exit lenses between the collision/reaction cell and the first and second mass filters, respectively, each of which include axially-spaced ion lenses and evacuation chambers between adjacent ion lenses. A plenum fluidly connects the evacuation chambers to the pump inlet to facilitate evacuation of collision or reaction gas escaping the collision/reaction cell to the pump away from the first and second mass filters.

19 Claims, 4 Drawing Sheets

DUCTING GAS OF MASS SPECTROMETER

BACKGROUND OF INVENTION

Field of Invention

This application relates, in general, to the field of mass spectrometry, and more particularly to the ducting of gas away from mass filters to improve transmission.

Description of Related Art

Mass spectrometry can be used to perform detailed analysis on samples. It can provide both qualitative (e.g., is X present) and quantitative (e.g., how much X is present) data for a large number of compounds in a sample. These capabilities have been used for a wide variety of analysis, such as to test for drug use, determine pesticide residues in food, monitor water quality, and the like.

A typical mass spectrometer utilized for GC-MS, LC-MS, IC-MS, or ICP-MS generally requires some means of high vacuum pumping. Such pumping helps remove permanent gases (e.g., nitrogen and oxygen) as well as carrier gases (e.g., helium, hydrogen, or nitrogen) in order to achieve appropriate mean free path lengths for the transmission of ion beams. Removal of such gases additionally prevents unwanted ion-molecule reactions, collisional scattering, oxidation of source components and high voltage breakdown. And such pumping helps maintain a high vacuum environment to remove introduced contaminants which would otherwise result in adverse analytical performance.

Existing mass spectrometers generally utilize a multistage turbomolecular pump or multiple turbomolecular pumps for the removal of these contaminants from a vacuum chamber, and/or complicated split flow arrangements to accommodate higher gas loads or various sections of a vacuum manifold operating at different pressures.

Existing mass spectrometers often utilize mass filters with large gaps between quadrupole rods to ensure gas escaping from a collision cell may escape quickly from the mass filters. However, such large gaps allow neutrals to enter the quadrupole. In other words, gas that has already escaped from the collision cell may end up in the vacuum chamber, and it may inadvertently enter the mass filters. Collisions of the ions with gases in the vacuum chamber are detrimental to the performance of the mass filter.

It would therefore be useful to provide new ducting configurations that overcome the above and other disadvantages of known mass spectrometers.

BRIEF SUMMARY

One aspect of the present invention is directed to a mass spectrometer including: a vacuum chamber; a vacuum pump having a pump inlet operably connected to the vacuum chamber for maintaining the vacuum chamber at an operating vacuum pressure; an ion source for generating a plurality of ions from a sample; a first mass filter within the vacuum chamber configured to select precursor ions from the plurality of ions; a collision/reaction cell within the vacuum chamber pressurized with a collision or reaction gas and configured to generate a plurality of product ions from the precursor ions by colliding or reacting the precursor ions with one or more gas particles; a second mass filter within the vacuum chamber configured to select target ions from the plurality of product ions; an entrance lens between the first mass filter and the collision/reaction cell and an exit lens between the collision/reaction cell and the second mass filter, wherein each of the entrance lens and the exit lens include a plurality of axially-spaced ion lenses and evacuation chambers between adjacent ion lenses; and a plenum fluidly connecting the evacuation chambers to the pump inlet to facilitate evacuation of collision or reaction gas escaping the collision/reaction cell to the pump inlet away from the first and second mass filters.

Another aspect of the present invention is directed to a mass spectrometer including: a vacuum pump for maintaining a vacuum pressure within a vacuum chamber; a mass filter within the vacuum chamber; an elevated gas cell pressurized with a collision or reaction gas at an elevated pressure above the vacuum pressure; an ion guide providing at least one of an entrance aperture to and an exit aperture from the elevated gas cell; one or more evacuation chambers between the elevated gas cell and the mass filter, the one or more evacuation chambers abutting against or substantially enclosing the ion guide; and a plenum fluidly connecting the one or more evacuation chambers to the vacuum pump to facilitate evacuation of collision or reaction gas escaping the elevated gas cell to the vacuum pump and away from the mass filter.

And a further aspect of the present invention is directed to a mass spectrometer including: a vacuum pump for maintaining a vacuum pressure within a chamber; a collision/reaction cell pressurized with a collision or reaction gas at an elevated pressure above the vacuum pressure; a mass filter within the chamber; an ion lens stack including a plurality of axially-spaced ion lenses and one or more evacuation chambers between adjacent ion lenses, the ion lens stack forming at least one of an entrance aperture to and an exit aperture from the collision/reaction cell; and a plenum fluidly connecting the one or more evacuation chambers to the vacuum pump to facilitate evacuation of collision or reaction gas escaping the collision/reaction cell to the vacuum pump and away from the mass filter.

Embodiments of the invention may include one or more of the following features.

The vacuum pump may be a turbomolecular pump.

The ion source may be an electron ionization (El) ion source.

The collision/reaction cell may include a body enclosing a quadrupole, and the collision/reaction cell further may include first and second receptacles on the body respectively receiving the entrance lens and the exit lens.

Each receptacle may include a peripheral wall substantially surrounding an outer periphery of the respective plurality of axially-spaced ion lenses thereby substantially enclosing the evacuation chambers, whereby collision or reaction gas escaping from the collision/reaction cell enters the evacuation chambers through ion apertures of the respective ion lenses and leaves substantially through the plenum.

The ion apertures may have a first gas conductance that limits collision or reaction gas flow out of the collision/reaction cell allowing elevated pressures within the collision/reaction cell higher than the operating pressure of the vacuum chamber.

The evacuation chambers and the plenum may provide a fluid pathway having a second gas conductance higher than the first gas conductance thereby facilitating the flow of escaping collision or reaction gas through the plenum and away from the vacuum chamber.

At least one of the entrance lens and exit lens may be a DC electrostatic lens.

At least one of the entrance lens and exit lens may be round, and the corresponding evacuation chambers may be annular evacuation chambers.

At least one of the entrance lens and exit lens may be an Einzel lens including three axially-spaced ion lenses with corresponding evacuation chambers formed therebetween.

The plenum may include an outlet adjacent the inlet of the vacuum pump, wherein the outlet does not cover the entire inlet of the vacuum pump such that the inlet also evacuates the vacuum chamber.

The mass spectrometer may be a triple-quadrupole mass spectrometer.

Each of the first mass filter, the collision/reaction cell, and the second mass filter may include a quadrupole.

The ion guide may be an ion lens, and the elevated gas cell may include a body substantially enclosing a quadrupole. The elevated gas cell may further include a receptacle on the body receiving the ion lens. The receptacle may include a peripheral wall substantially surrounding an outer periphery of the ion lens and substantially surrounding the one or more evacuation chambers, whereby collision or reaction gas escaping the elevated gas cell enters the one or more evacuation chambers through the at least one of the entrance and exit apertures and leaves the one or more evacuation chambers through the plenum.

At least one of the entrance and exit apertures may have a first gas conductance that limits collision or reaction gas flow out of the elevated gas cell allowing elevated pressures within the elevated gas cell higher than the vacuum pressure of the vacuum chamber, and wherein the one or more evacuation chambers and the plenum may provide a fluid pathway having a second gas conductance higher than the first gas conductance thereby facilitating the flow of escaping collision or reaction gas through the plenum and away from the vacuum chamber.

The ion guide may be a DC electrostatic lens.

The ion guide may be an ion lens stack may include a plurality of axially-spaced ion lenses, and the one or more evacuation chambers may be between adjacent ion lenses.

The ion lens stack may be round, and the corresponding one or more evacuation chambers may be annular evacuation chambers.

The ion guide may be an Einzel lens including three axially-spaced ion lenses with corresponding evacuation chambers formed therebetween.

The plenum may include an outlet adjacent the vacuum pump that partially covers an inlet of the vacuum pump that evacuates the vacuum chamber.

BRIEF DESCRIPTION OF THE DRAWINGS

For a more complete understanding of the principles disclosed herein, and the advantages thereof, reference is now made to the following descriptions taken in conjunction with the accompanying drawings and exhibits, in which.

It is to be understood that the figures are not necessarily drawn to scale, nor are the objects in the figures necessarily drawn to scale in relationship to one another. The figures are depictions that are intended to bring clarity and understanding to various embodiments of apparatuses, systems, and methods disclosed herein. Wherever possible, the same reference numbers will be used throughout the drawings to refer to the same or like parts. Moreover, it should be appreciated that the drawings are not intended to limit the scope of the present teachings in any way.

DETAILED DESCRIPTION

In this detailed description of the various embodiments, for purposes of explanation, numerous specific details are set forth to provide a thorough understanding of the embodiments disclosed. One skilled in the art will appreciate, however, that these various embodiments may be practiced with or without these specific details. Furthermore, one skilled in the art can readily appreciate that the specific sequences in which methods are presented and performed are illustrative and it is contemplated that the sequences can be varied and still remain within the spirit and scope of the various embodiments disclosed herein.

Figure 1:
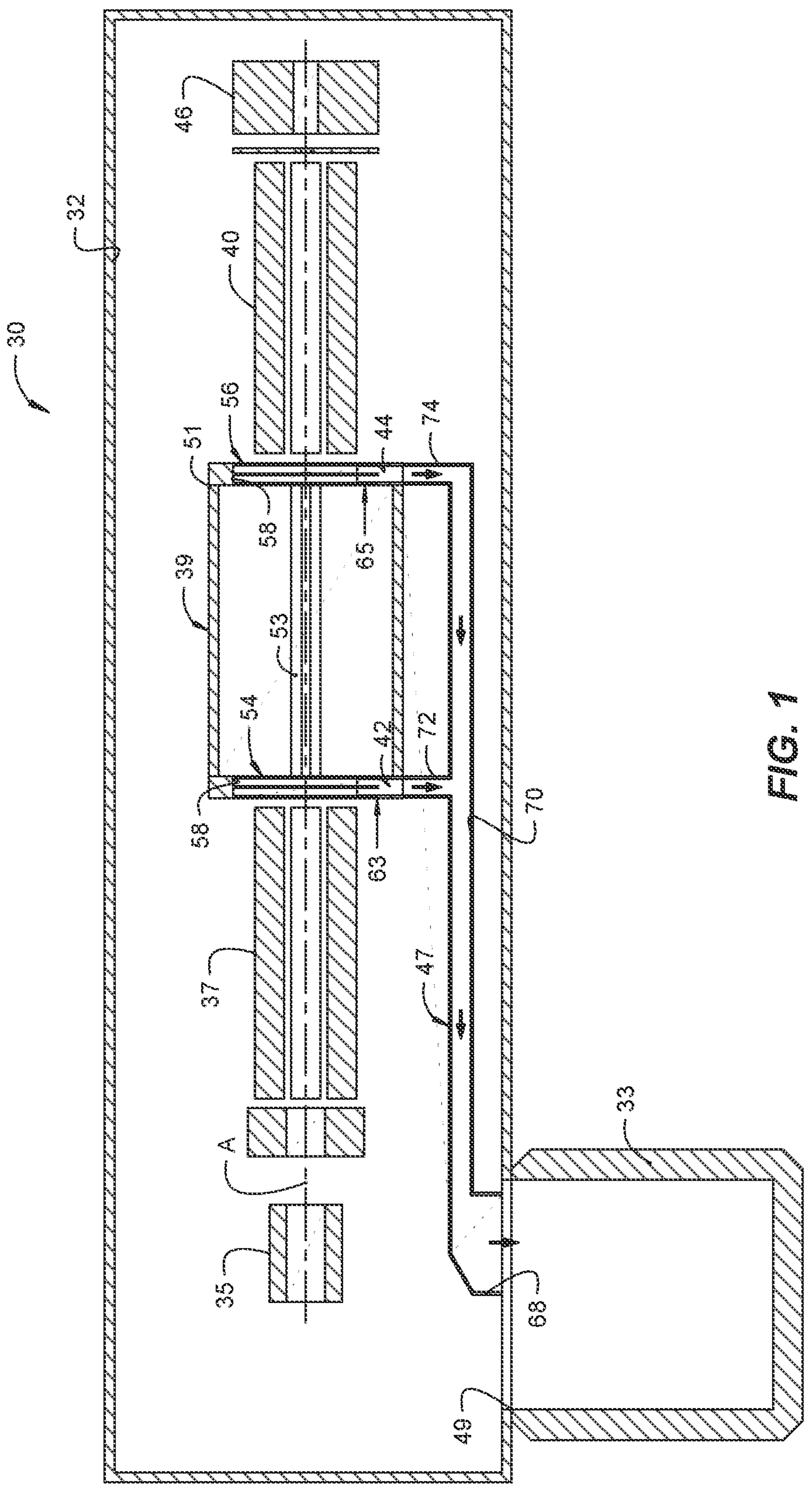
FIG. 1 is a cross-sectional view of an exemplary mass spectrometer in accordance with various aspects of the present invention.

Turning now to the drawings, wherein like components are designated by like reference numerals throughout the various figures, attention is directed to FIG. 1 which shows an exemplary mass spectrometer in accordance with various aspects of the present invention, the mass spectrometer generally designated 30.

In various embodiments, mass spectrometer 30 generally includes a vacuum chamber 32, a vacuum pump 33, an ion source 35, a first mass filter 37, an elevated gas cell 39, a second mass filter 40, first and second evacuation chambers 42, 44 between the elevated gas cell and each of the mass filters, an ion detector 46, and a plenum 47 fluidly connecting the evacuation chambers to the vacuum pump. In accordance with various embodiments, configuration of the evacuation chambers and the plenum may channel neutrals escaping from the elevated gas cell directly to the vacuum pump thus reducing the chance they will enter the mass filters.

Various aspects of the exemplary mass spectrometers described herein are similar to those disclosed by U.S. Pat. No. 10,607,824 to Thermo Finnigan LLC, U.S. Pat. No. 7,230,232 to Thermo Fisher Scientific (Bremen) GmbH, and U.S. Pat. No. 8,740,587 to Thermo Finnigan LLC, the entire content of which patents is expressly incorporated herein for all purposes by this reference.

Collision cells generally need a high enough pressure to fragment or react ions, and ultimately collisionally cool ions to be used for analysis purposes. This is increasingly more difficult at higher mass/charge ratios (m/z) because such ions lose less energy in each collision and often start with higher kinetic energy because higher collision energies are needed for fragmentation. Thus, the elevated gas cell 39 of mass spectrometer 30 may include a collision cell, a reaction cell, and/or a cooling cell. For the purposes of ease and convenience, "collision cell" will be understood to refer to a collision cell, a reaction cell, and/or a cooling cell throughout this Detailed Description.

Figure 4:
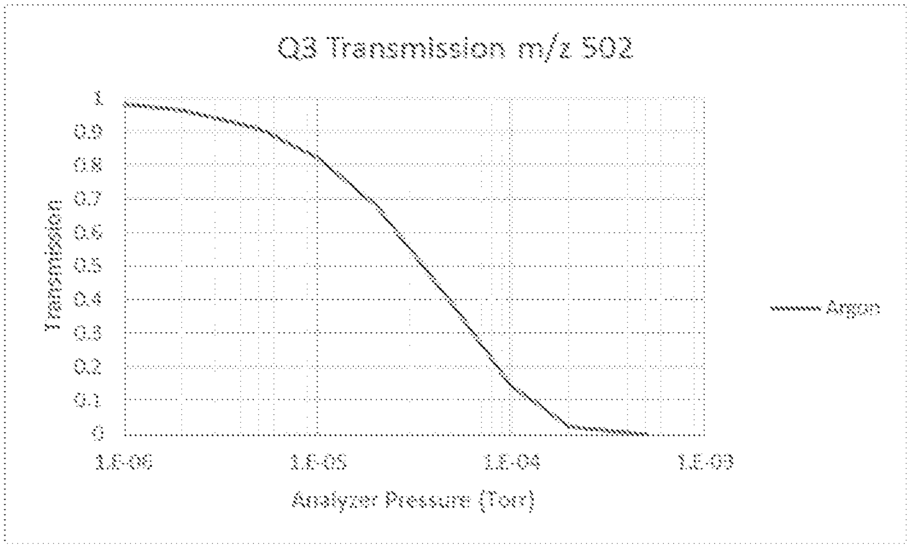
FIG. 4 is a graph illustrating exemplary effects of pressure on transmission by an exemplary mass spectrometer.

Mass spectrometers may have collision cell pressures in the range of 1-100 mTorr, ideally 4-10 mTorr, and quadrupole pressures of approximately 1×10−6 Torr to 1×10−4 Torr, ideally <1×10−5 Torr. As such, very small changes in quadrupole pressure lead to significant differences in transmission, as shown in FIG. 4. Thus, it would be advantageous to minimize the amount of gas escaping from the collision cell while maintaining pressure within the collision cell.

Unfortunately, gas is prone to escape from a collision cell through its entrance and exit apertures, which apertures are necessary to receive precursor ions from an upstream mass filter and to direct product ions to a downstream mass filter. Smaller apertures are preferred in order to minimize gas from escaping from the collision cell to the first and second mass filters (and other components of the mass spectrometer), because such escaping gas may have a very detrimental effect on ion transmission through the mass filters. However, there is a practical lower limit to the size of these apertures that allows ion beams to enter and exit the collision cell. As discussed below, evacuation chambers may be provided to reduce the amount of gas that escapes from the collision cell to the mass filters.

In various embodiments, the mass spectrometer may be provided with one or more mass filters to separate ions or detect ions based on a desired m/z ratio of the ions. For example, the mass filters may include a quadrupole mass filter analyzer, a quadrupole ion trap analyzer, a time-of-flight (TOF) analyzer, an electrostatic trap (e.g., ORBITRAP) mass analyzer, Fourier transform ion cyclotron resonance (FT-ICR) mass analyzer, and the like.

In various embodiments, the mass spectrometer may also be configured to fragment ions or react ions using collision induced dissociation (CID), electron transfer dissociation (ETD), electron capture dissociation (ECD), photo induced dissociation (PID), surface induced dissociation (SID), and the like, and further separate the fragmented or reacted ions, that is product ions based on the mass-to-charge ratio.

And in various embodiments, the mass spectrometer may also be configured to detect ions. For example, the mass spectrometer may include an electron multiplier, a Faraday cup, and the like. Ions leaving the second mass filter can be detected by the ion detector. In various embodiments, the ion detector can be quantitative such that an accurate count of the ions can be determined.

In various embodiments, the mass spectrometer may be a triple-quadrupole mass spectrometer, in which each of a first mass filter, a collision cell, and a second mass filter include a quadrupole. In the case of a triple-quadrupole mass spectrometer, the first and second mass filters are often referred to as "Q1" and "Q3" respectively, with the collision cell being referred to as "Q2".

Vacuum chamber 32 may be pumped with a single vacuum pump 33 that includes a pump inlet 49 operably connected to vacuum chamber 32 for maintaining the vacuum chamber at an operating vacuum pressure within the vacuum chamber. While the collision cell 39 is located within the vacuum chamber, the vacuum chamber may otherwise be open, in which no partitions or baffles are necessary to divide the vacuum chamber into separate regions for ion source 35, first mass filter 37, second mass filter 40, and/or ion detector 46. One will appreciate that various embodiments may include separate regions within the vacuum chamber, but such separate regions are not necessary in accordance with various aspects of the disclosed embodiments.

Various embodiments are well suited for use with single stage pumps, which are less expensive and simpler than the multi-stage turbomolecular pumps often used in prior devices. One will appreciate, however, that a wide variety of pumps may be utilized including, but not limited to, single stage turbomolecular pumps, multiple-stage turbomolecular pumps, multiple turbomolecular pumps, diffusion pumps, cryogenic pumps, getter pumps, and/or other suitable means for drawing a high vacuum within the vacuum chamber.

Ion source 35 is configured to generate a plurality of ions from a sample. In various embodiments, the ion source can include a matrix assisted laser desorption/ionization (MALDI) source, an electrospray ionization (ESI) source, an atmospheric pressure chemical ionization (APCI) source, an atmospheric pressure photoionization source (APPI), an inductively coupled plasma (ICP) source, an electron ionization (EI) ion source, a chemical ionization (CI) source, a photoionization source, a glow discharge ionization source, a thermospray ionization source, and the like.

A first mass filter 37 is provided within vacuum chamber 32 upstream from collision cell 39 in order to select parent or precursor ions from the ions generated by the ion source. The first mass filter also directs the resulting beam of precursor ions to the collision cell, focused substantially along axis line A.

In various embodiments, the precursor ions can have a mass to charge ratio within a particular m/z range, such that the precursor ion is selectively transported to the collision cell.

The collision cell is configured to generate a plurality of product ions from precursor ions by colliding or reacting the precursor ions with one or more gas particles. Specifically, the precursor ions may be directed through a collision or reaction gas in order to cause precursor ions to fragment into one or more fragment ions or to react into one or more reactant ions. The fragment ions and the reactant ions may be collectively referred to as product ions.

Thus, collision cell 39 is provided within vacuum chamber 32 and is a substantially gas-tight enclosure through which ions are transmitted from the ion source and toward the ion detector. The collision cell is pressurized with a collision or reaction gas at an elevated pressure above the vacuum pressure of the main vacuum chamber. The collision gas or the reaction gas may be collectively referred to as a target gas. As the entrance and exit apertures of the collision cell are relatively small, the pressure within the collision cell can be regulated by altering the flow of the target gas into the collision cell.

One will appreciate that in various embodiments the target gas is generally made up of individual atoms (e.g., monatomic gases such as helium, argon, etc.) or elemental molecules (e.g., diatomic molecules such as hydrogen, nitrogen, oxygen, etc.). One will further appreciate that other gases or mixes of gases may be utilized such as those including compound molecules (e.g., ammonia, methane, etc.). The particular gas utilized may be selected for various analytical requirements and physical properties.

One will appreciate that the product ions may be fragments and/or reaction products. For example, in gas chromatography-mass spectrometry (GC-MS), liquid chromatography-mass spectrometry (LC-MS), ion chromatography-mass spectrometry (IC-MS), and most other ionization techniques, collision cells fragment ions. And in inductively coupled plasma mass spectrometry, (ICP-MS) collision cells may either fragment or react ions. One will appreciate that the collision cells (and the corresponding mass spectrometers) may, in various embodiments, be configured to fragment and/or react ions to generate the desired product ions.

In various embodiments, collision cell 39 generally includes a body 51 enclosing a cell quadrupole 53. One will appreciate, however, that it may enclose a hexapole, an octupole, or other higher order multipoles. It may also enclose various types of collision cells such as stacked ring ion guides, a structure for lossless ion manipulations (SLIM) device, an ion funnel, or an ion carpet. One will appreciate that other means may be provided to seal the collision cell, in addition to or instead of the body, to allow the pressurization of gas within the collision cell.

Figure 2:
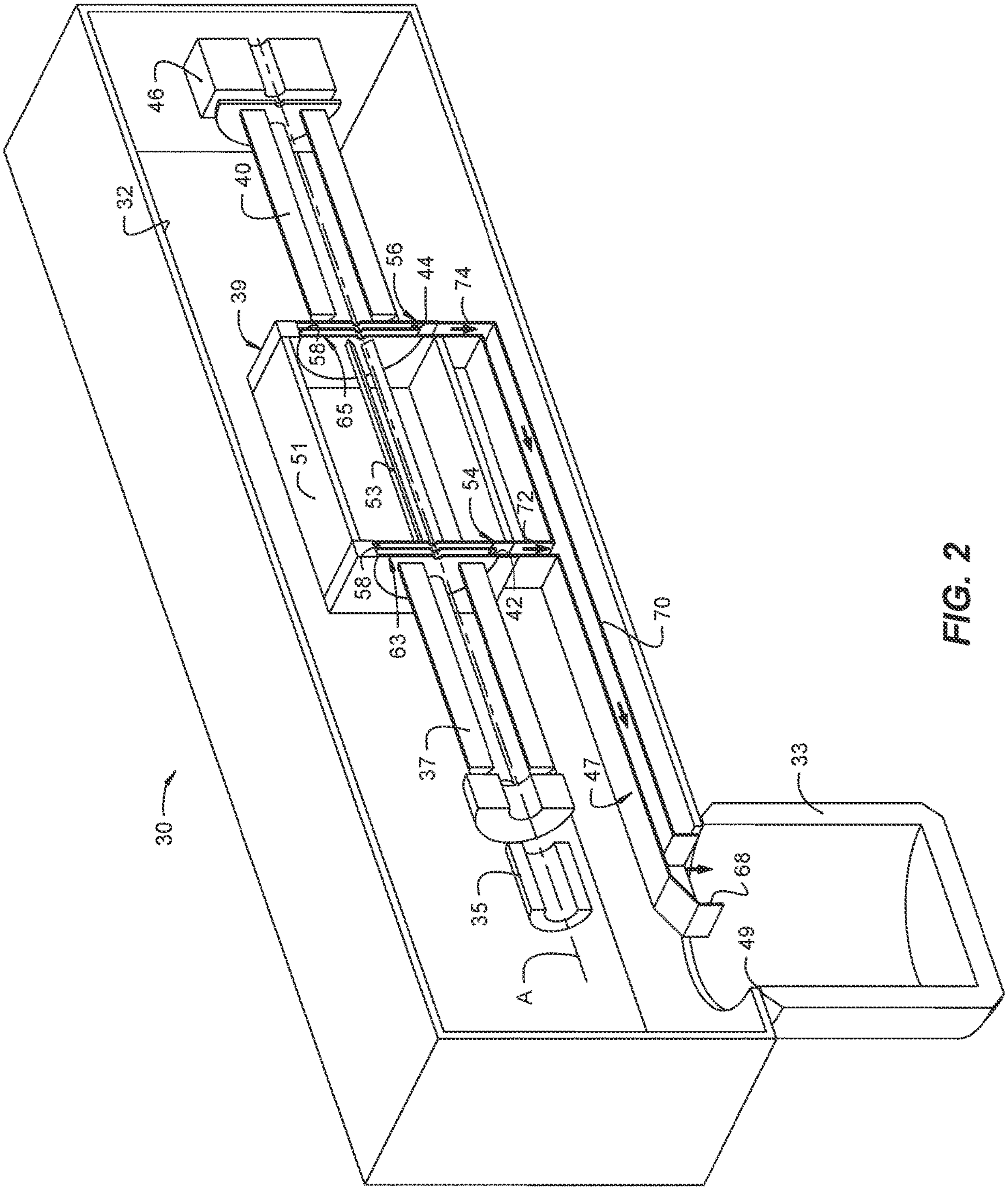
FIG. 2 is a perspective view of the mass spectrometer of FIG. 1.

With reference to FIG. 2, the collision cell may further include first and second receptacles 54, 56 on the body that are configured, respectively, to receive entrance and exit lenses as described below. Each receptacle includes a peripheral wall 58 substantially surrounding an outer periphery of the lenses.

A second mass filter 40 is provided within the vacuum chamber downstream from collision cell 39 in order to select target ions from the plurality of product ions generated by the collision cell.

The second mass filter may be a quadrupole mass filter configured to selectively transport a specific product ion based on the m/z ratio, such that selected target ions of the product ions resulting from a particular fragmentation or reaction in the collision cell reach the detector. One will appreciate that various ion detectors may be utilized including, but not limited to, Faraday cups, discrete dynode electron multipliers, and continuous dynode electron multipliers, photomultipliers, silicon photomultiplier detectors, avalanche diode detectors, avalanche photodiode detectors, and the like.

The illustrated mass filters include quadrupoles. One will appreciate, however, that the mass filters may include a monopole, hexapole, octupole or other higher order multipole, an ion guide, an ion lens, a stacked ring ion guide, a structure for lossless ion manipulations (SLIM) device, an ion funnel, an ion carpet, and/or other suitable mass selective devices.

Figure 3:
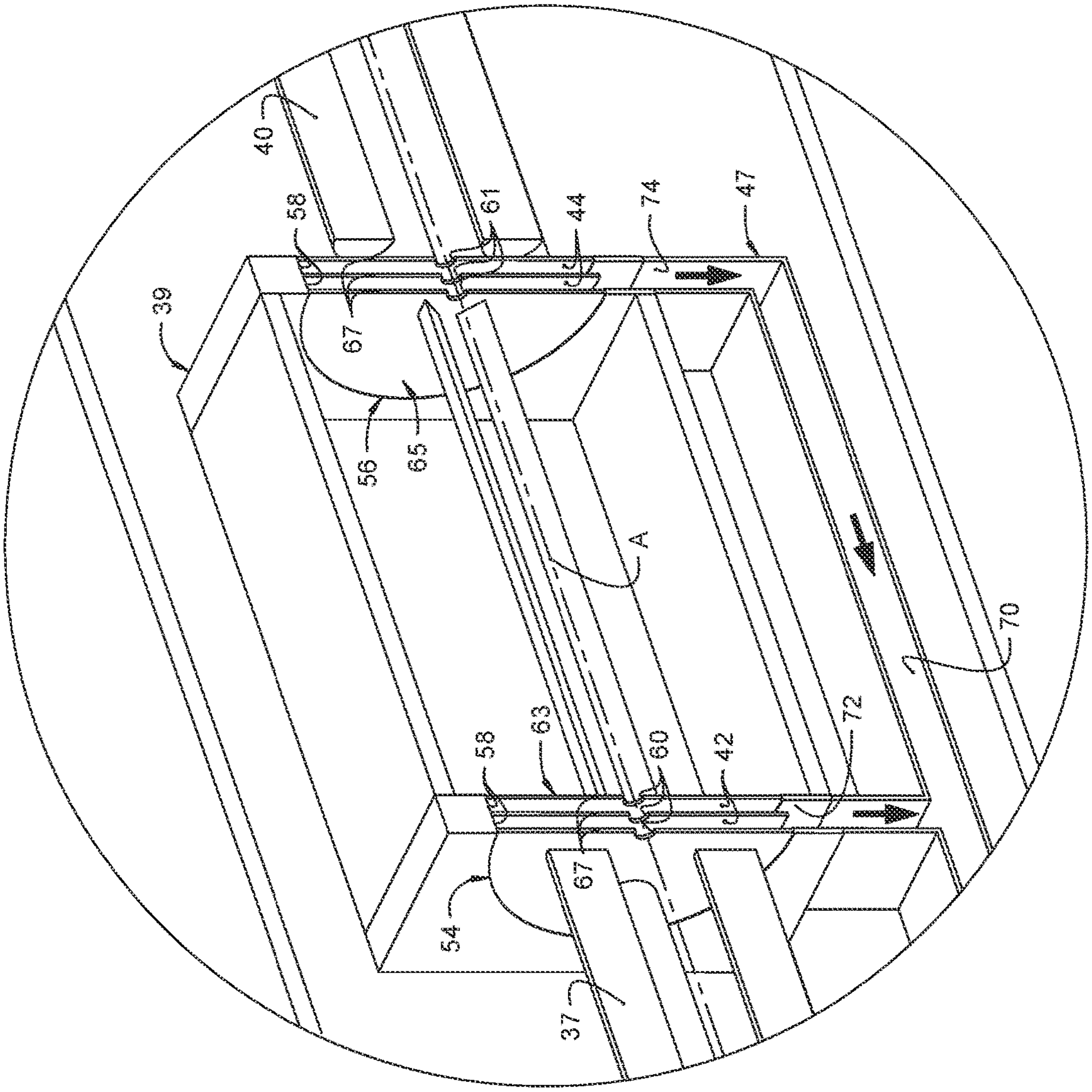
FIG. 3 is an enlarged view of a detail of FIG. 2.

With reference to FIG. 3, an entrance aperture 60 is provided between first mass filter 37 and the collision cell 39, and an exit aperture 61 is provided between the collision cell and second mass filter 40. An entrance lens 63 may form the entrance aperture and an exit lens 65 may form the exit aperture.

In various embodiments, each of the entrance lens and the exit lens may be an ion lens stack including a plurality of axially-spaced ion lenses 67 that form one or more evacuation chambers (e.g., chambers 42 or 44) between adjacent ion lenses. The evacuation chambers are essentially defined and substantially enclosed by the opposing surfaces of the adjacent ion lenses along with the peripheral wall 58 of the first and second receptacles.

In various embodiments, the entrance and/or exit lens may be an Einzel lens including three or more axially-spaced ion lenses with corresponding evacuation chambers formed therebetween. The configuration of an Einzel lens is quite efficient in allowing neutrals to escape between the lenses while at the same time transporting and focusing ions into the mass filters.

The configuration of multiple axially-narrow evacuation chambers formed by an Einzel lens fluidly connected to the plenum helps prevent gas from escaping through the entrance and exit apertures and into the mass filters. The nature of gas diffuse reflection or Lambertian reflectance helps in diverting escaping gas from the outermost apertures of the lenses—deflecting gas molecules with a cosine distribution relative to the normal of the lens surfaces creates an angular distribution of flight throughout the evacuation chamber whereby the escaping gas has a greater probability of moving through the plenum to the vacuum pump as opposed to moving through the small outermost hole of the ion lenses into the vacuum chamber and toward the mass filters. And one will appreciate that each additional evacuation chamber increases the likelihood of the escaping gas to move through the plenum to the vacuum pump.

One will appreciate that other types of ion guides may also be suitable. For example, the ion guides may include ion lenses having multiple lens plates with variously sized apertures, multiple lens tubes, stacked-ring ion guides, and the like. One will appreciate that in some embodiments, the ion guides may include extensions of multipole rods extending out from the collision cell, and/or may include pre- or post-filters upstream and downstream of the collision cell, respectively. And in some embodiments, the ion guides may include a dedicated ion guide upstream and/or downstream from the collision cell, including, but not limited to, a monopole, hexapole, octupole or other higher order multipole, an ion lens, a stacked ring ion guide, a structure for lossless ion manipulations (SLIM) device, an ion funnel, an ion carpet, and/or other suitable device.

In various embodiments, the entrance lens and/or the exit lens may be a DC electrostatic lens. DC voltages can be applied to entrance lens and exit lens to create potential gradients that can affect the kinetic energy of the ions entering and exiting the collision cell.

Plenum 47 fluidly connects first and second evacuation chambers 42, 44 to the vacuum pump inlet 49 to facilitate evacuation of gas escaping the collision cell 39 to the vacuum pump inlet 49 and away from the first and second mass filter 37, 40. Gas escaping from collision cell 39 toward first mass filter 37 enters the first evacuation chambers 42 through entrance apertures 60 of the respective ion lenses and may leave the first evacuation chambers through the plenum. Similarly, gas escaping from collision cell 39 toward second mass filter 40 enters the second evacuation chambers 44 through exit apertures 61 of the respective ion lenses and may leave the second evacuation chambers through the plenum.

The plenum generally includes ducting that fluidly connects the evacuation chambers to a plenum outlet 68 adjacent the inlet of the vacuum pump. Plenum 47 generally includes a larger main trunk 70 running below the collision cell toward the vacuum pump with takeoff branches interconnecting the evacuation chambers to the main trunk. For example, and as seen in FIG. 3, a first branch 72 fluidly connects the first evacuation chambers 42 to the trunk, and a second branch 74 fluidly connects the second evacuation chambers 44 to the trunk.

The plenum may be formed of discrete ducting structure located within the vacuum chamber. And/or the plenum may be integral with other components of the mass spectrometer such as a base or platform supporting the vacuum chamber, a manifold that is within or supports the vacuum chamber (e.g., a machined, cast, or printed manifold), or other suitable components of the mass spectrometer. Such configuration allows the plenum to conduct gas escaping from the collision cell directly to the inlet of the pump and separate from the vacuum chamber. In various embodiments, the outlet does not cover the entire inlet of the vacuum pump such that the inlet may also evacuate the vacuum chamber. One will appreciate that, in various embodiments, the plenum may be ducted to a dedicated pump inlet that only pumps gases through the plenum, such as an interstage port of a multistage turbomolecular pump.

In accordance with various embodiments, the configuration of the evacuation cells and the plenum allows for deliberate venting of gas away from the collision cell while allowing lower pressures in the other regions of the vacuum chamber.

Figure 5:
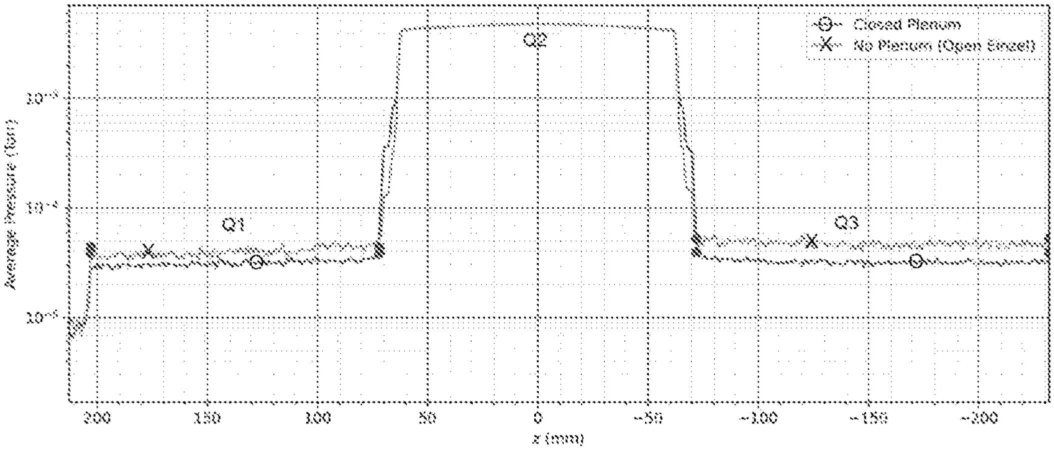
FIG. 5 is a graph illustrating the difference of pressures within a first mass filter (Q1), a collision cell (Q2), and a second mass filter (Q3) of an exemplary mass spectrometer when using a closed plenum (+), and when using no plenum (x).
Figure 6:
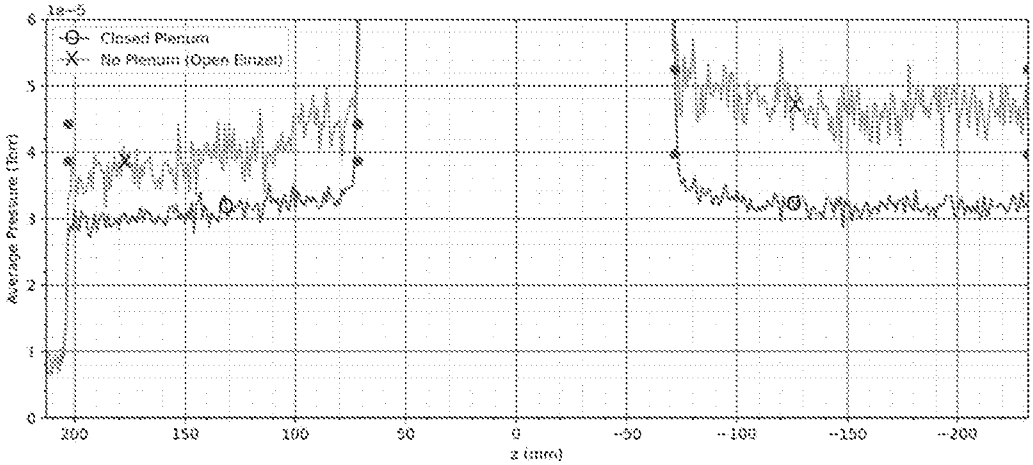
FIG. 6 is another view of the graph of FIG. 5 with an enlarged vertical axis scale to further illustrate the difference of pressures within the first and second mass filters (Q1 and Q3).

For example, the configuration of the evacuation cells and the plenum may increase pressure within the collision cell approximately 10% using the same flow rate of gas into the collision cell, as shown in FIG. 4. This allows the use of a lower flow rate of target gas to obtain the same collision cell pressure. And zooming in, even with the same collision cell pressure, the pressure in the quadrupoles is lower, as shown in FIG. 5. The average Q1 pressure is 0.79× and Q3 is 0.68×. These lower pressures are estimated to increase transmission of m/z 502 by 1.5× and m/z 1100 by 2.5×. In some embodiments, there may be a greater improvement in Q3 pressures (when Q3 is further from the vacuum pump than Q1), mainly because it is much more difficult for gas molecules in the rear part of the vacuum chamber near Q3 (and away from the vacuum pump) to find the vacuum pump (when positioned closer to Q1).

In various embodiments, the ion apertures may have a first gas conductance that limits collision or reaction gas flow out of the collision cell allowing elevated pressures within the collision cell higher than the operating pressure of the vacuum chamber. And the evacuation chambers and the plenum may provide a fluid pathway having a second gas conductance higher than the first gas conductance thereby facilitating the flow of escaping collision or reaction gas through the plenum and away from the vacuum chamber.

In various embodiments, the entrance lens and/or the exit lens is round, and the corresponding evacuation chambers may be similarly dimensioned annular evacuation chambers. One will appreciate that the lenses and chambers may have various other shapes including, but not limited to, oval, square, hexagonal, octagonal, and the like.

A controller may be provided to communicate with the various components of the mass spectrometer in an otherwise conventional manner. For example, a controller may configure the ion source or enable/disable the ion source. Additionally, the controller may configure the first mass filter to select a particular mass range to detect.

Further, the controller may adjust the second mass filter, such as by adjusting the polarity of the second mass filter based on the polarity of the ions being detected. For example, the second mass filter may be configured to detect positive ions or be configured to detected negative ions. And the controller may adjust the ion detector, such as by adjusting its gain.

Such a controller is generally a control and data system (not depicted) that will typically consist of a combination of general-purpose and specialized processors, application-specific circuitry, and software and firmware instructions. The control and data system may also provide data acquisition and post-acquisition data processing services.

Advantageously, the configurations of the mass spectrometers discussed above facilitate relatively high pressures within the collision cells while significantly reducing or preventing unwanted gas from reaching the quadrupole mass filters to minimize the effects the gas may have on quadrupole transmission. In other words, such configurations effectively guide neutrals to the vacuum pump while keeping them out of areas where they reduce performance.

Despite an open vacuum-chamber configuration, and unlike prior singularly pumped systems, the evacuation chambers described herein prevent contaminants from migrating freely throughout the vacuum chamber and depositing on various elements within the vacuum chamber. Thus, in accordance with various embodiments, promoting a pressure differential between the vacuum chamber and the collision cell while preventing unwanted particles entering the vacuum chamber from the collision cell using a single vacuum pump.

For convenience in explanation and accurate definition in the appended claims, the terms "upstream", "downstream", "below", and the like are used to describe features of the exemplary embodiments with reference to the positions of such features as displayed in the figures.

The foregoing descriptions of specific exemplary embodiments have been presented for purposes of illustration and description. They are not intended to be exhaustive or to limit the claims to the precise forms disclosed, and obviously many modifications and variations are possible in light of the above teachings. The exemplary embodiments were chosen and described in order to explain certain principles and their practical application, to thereby enable others skilled in the art to make and utilize various exemplary embodiments, as well as various alternatives and modifications thereof.

What is claimed is:

1. A mass spectrometer comprising:

a vacuum chamber;

a vacuum pump having a pump inlet operably connected to the vacuum chamber for maintaining the vacuum chamber at an operating vacuum pressure;

an ion source for generating a plurality of ions from a sample;

a first mass filter within the vacuum chamber configured to select precursor ions from the plurality of ions;

a collision/reaction cell within the vacuum chamber pressurized with a collision or reaction gas and configured to generate a plurality of product ions from the precursor ions by colliding or reacting the precursor ions with one or more gas particles;

a second mass filter within the vacuum chamber configured to select target ions from the plurality of product ions;

an entrance lens between the first mass filter and the collision/reaction cell and an exit lens between the collision/reaction cell and the second mass filter, wherein each of the entrance lens and the exit lens include a plurality of axially-spaced ion lenses and evacuation chambers between adjacent ion lenses; and a plenum fluidly connecting the evacuation chambers to the pump inlet to facilitate evacuation of collision or reaction gas escaping the collision/reaction cell to the pump inlet away from the first and second mass filters;

wherein the collision/reaction cell includes a body enclosing a quadrupole, and the collision/reaction cell further includes first and second receptacles on the body respectively receiving the entrance lens and the exit lens, each receptacle including a peripheral wall substantially surrounding an outer periphery of the respective plurality of axially-spaced ion lenses thereby substantially enclosing the evacuation chambers, whereby collision or reaction gas escaping from the collision/reaction cell enters the evacuation chambers through ion apertures of the respective ion lenses and leaves substantially through the plenum.

2. The mass spectrometer of claim 1, wherein the vacuum pump is a turbomolecular pump.

3. The mass spectrometer of claim 1, wherein the ion source is an electron ionization (EI) ion source.

4. The mass spectrometer of claim 1, wherein the ion apertures have a first gas conductance that limits collision or reaction gas flow out of the collision/reaction cell allowing elevated pressures within the collision/reaction cell higher than the operating pressure of the vacuum chamber, and wherein the evacuation chambers and the plenum provide a fluid pathway having a second gas conductance higher than the first gas conductance thereby facilitating the flow of escaping collision or reaction gas through the plenum and away from the vacuum chamber.

5. The mass spectrometer of claim 1, wherein at least one of the entrance lens and exit lens is a DC electrostatic lens.

6. The mass spectrometer of claim 5, wherein at least one of the entrance lens and exit lens is round, and wherein the corresponding evacuation chambers are annular evacuation chambers.

7. The mass spectrometer of claim 1, wherein at least one of the entrance lens and exit lens is an Einzel lens including three axially-spaced ion lenses with corresponding evacuation chambers formed therebetween.

8. The mass spectrometer of claim 1, wherein the plenum includes an outlet adjacent the inlet of the vacuum pump, and wherein the outlet does not cover the entire inlet of the vacuum pump such that the inlet also evacuates the vacuum chamber.

9. The mass spectrometer of claim 1, wherein the mass spectrometer is a triple-quadrupole mass spectrometer, and wherein each of the first mass filter, the collision/reaction cell, and the second mass filter include a quadrupole.

10. A mass spectrometer comprising:

a vacuum pump for maintaining a vacuum pressure within a vacuum chamber;

a mass filter within the vacuum chamber;

an elevated gas cell pressurized with a collision or reaction gas at an elevated pressure above the vacuum pressure, the elevated gas cell within the vacuum chamber;

an ion guide providing at least one of an entrance aperture to and an exit aperture from the elevated gas cell;

one or more evacuation chambers between the elevated gas cell and the mass filter, the one or more evacuation chambers abutting against and substantially enclosing the ion guide; and a plenum fluidly connecting the one or more evacuation chambers to the vacuum pump to facilitate evacuation of collision or reaction gas escaping the elevated gas cell to the vacuum pump and away from the mass filter wherein the ion guide is an ion lens, wherein the elevated gas cell includes a body substantially enclosing a quadrupole, and the elevated gas cell further includes a receptacle on the body receiving the ion lens, the receptacle including a peripheral wall substantially surrounding an outer periphery of the ion lens and substantially surrounding the one or more evacuation chambers, whereby collision or reaction gas escaping the elevated gas cell enters the one or more evacuation chambers through the at least one of the entrance and exit apertures and leaves the one or more evacuation chambers through the plenum.

11. The mass spectrometer of claim 10, wherein the vacuum pump is a turbomolecular pump.

12. The mass spectrometer of claim 10, wherein the at least one of the entrance and exit apertures has a first gas conductance that limits collision or reaction gas flow out of the elevated gas cell allowing elevated pressures within the elevated gas cell higher than the vacuum pressure of the vacuum chamber, and wherein the one or more evacuation chambers and the plenum provide a fluid pathway having a second gas conductance higher than the first gas conductance thereby facilitating the flow of escaping collision or reaction gas through the plenum and away from the vacuum chamber.

13. The mass spectrometer of claim 10, wherein the ion guide is a DC electrostatic lens.

14. The mass spectrometer of claim 10, wherein the ion guide is an ion lens stack including a plurality of axially-spaced ion lenses, and wherein the one or more evacuation chambers are between adjacent ion lenses.

15. The mass spectrometer of claim 14, wherein the ion lens stack is round, and wherein the corresponding one or more evacuation chambers are annular evacuation chambers.

16. The mass spectrometer of claim 10, wherein the ion guide is an Einzel lens including three axially-spaced ion lenses with corresponding evacuation chambers formed therebetween.

17. The mass spectrometer of claim 10, wherein the plenum includes an outlet adjacent the vacuum pump that partially covers an inlet of the vacuum pump that evacuates the vacuum chamber.

18. The mass spectrometer of claim 10, wherein the mass spectrometer is a triple-quadrupole mass spectrometer further including a second mass filter, wherein each of the mass filter, the elevated gas cell, and the second mass filter include a quadrupole.

19. A mass spectrometer comprising:

a vacuum pump for maintaining a vacuum pressure within a chamber;

a collision/reaction cell pressurized with a collision or reaction gas at an elevated pressure above the vacuum pressure;

a mass filter within the chamber;

an ion lens stack including a plurality of axially-spaced ion lenses and one or more evacuation chambers between adjacent ion lenses, the ion lens stack forming at least one of an entrance aperture to and an exit aperture from the collision/reaction cell; and a plenum fluidly connecting the one or more evacuation chambers to the vacuum pump to facilitate evacuation of collision or reaction gas escaping the collision/reaction cell to the vacuum pump and away from the mass filter wherein the collision/reaction cell includes a body enclosing a quadrupole, and the collision/reaction cell further includes first and second receptacles on the body respectively receiving the entrance lens and the exit lens, each receptacle including a peripheral wall substantially surrounding an outer periphery of the respective plurality of axially-spaced ion lenses thereby substantially enclosing the evacuation chambers, whereby collision or reaction gas escaping from the collision/reaction cell enters the evacuation chambers through ion apertures of the respective ion lenses and leaves substantially through the plenum.

* * * * *